(12) United States Patent
Jin et al.

(10) Patent No.: US 9,555,811 B2
(45) Date of Patent: Jan. 31, 2017

(54) METHOD AND APPARATUS FOR PROVIDING ANALYSIS INDEX OF ROADWAY SECTION BASED ON ROAD AND TRAFFIC CONDITIONS

(71) Applicant: THINKWARE SYSTEMS CORPORATION, Seoul (KR)

(72) Inventors: Hyung Min Jin, Gyeonggi-do (KR); Deuk Yeong Seong, Seoul (KR); Tae Hyeon Park, Seoul (KR)

(73) Assignee: THINKWARE CORPORATION, Gyeonggi-Do (KR)

( * ) Notice: Subject to any disclaimer, the term of this patent is extended or adjusted under 35 U.S.C. 154(b) by 69 days.

(21) Appl. No.: 13/659,300

(22) Filed: Oct. 24, 2012

(65) Prior Publication Data

US 2013/0110386 A1 May 2, 2013

Related U.S. Application Data

(60) Provisional application No. 61/552,504, filed on Oct. 28, 2011.

(30) Foreign Application Priority Data

Dec. 2, 2011 (KR) .......................... 10-2011-0128410

(51) Int. Cl.
*B60W 40/06* (2012.01)

(52) U.S. Cl.
CPC .......... *B60W 40/06* (2013.01); *B60W 2520/10* (2013.01); *B60W 2550/142* (2013.01); *B60W 2550/146* (2013.01); *B60W 2550/20* (2013.01); *B60W 2550/22* (2013.01); *B60W 2550/402* (2013.01)

(58) Field of Classification Search
None
See application file for complete search history.

(56) References Cited

U.S. PATENT DOCUMENTS

| | | | | |
|---|---|---|---|---|
| 7,706,964 | B2* | 4/2010 | Horvitz et al. | 701/117 |
| 8,290,695 | B2* | 10/2012 | Hiestermann et al. | 701/119 |
| 8,554,473 | B2* | 10/2013 | Arcot et al. | 701/423 |
| 8,712,676 | B2* | 4/2014 | Hiestermann et al. | 701/119 |
| 2007/0010933 | A1* | 1/2007 | Hochkirchen et al. | 701/117 |
| 2010/0023245 | A1* | 1/2010 | Huang et al. | 701/117 |
| 2010/0049397 | A1* | 2/2010 | Liu et al. | 701/33 |
| 2010/0114473 | A1* | 5/2010 | Kono et al. | 701/200 |
| 2011/0224891 | A1* | 9/2011 | Iwuchukwu | 701/117 |
| 2011/0307188 | A1* | 12/2011 | Peng et al. | 702/33 |
| 2012/0022781 | A1* | 1/2012 | Wilson | 701/410 |
| 2012/0066232 | A1* | 3/2012 | Engelhardt et al. | 707/748 |

* cited by examiner

*Primary Examiner* — John R Olszewski
*Assistant Examiner* — James M McPherson
(74) *Attorney, Agent, or Firm* — Saliwanchik, Lloyd & Eisenschenk

(57) ABSTRACT

Provided is an apparatus and method for providing an analysis index of a roadway section based on road and traffic conditions. The method may include calculating a traffic light density of a roadway section using a number of traffic lights installed in the roadway section, calculating road shape information based on at least one of a curvature and a gradient of the roadway section, calculating a speed variation of the roadway section using a change of speed in the roadway section, and calculating an analysis index of the roadway section using the traffic light density, the road shape information, and the speed variation.

19 Claims, 7 Drawing Sheets

METHOD AND APPARATUS FOR PROVIDING ANALYSIS INDEX OF ROADWAY SECTION BASED ON ROAD AND TRAFFIC CONDITIONS

CROSS-REFERENCE TO RELATED APPLICATIONS

This application claims the benefit under 35 U.S.C. §119 of U.S. Provisional Application No. 61/552,504, filed Oct. 28, 2011 and Korean Patent Application No. 10-2011-0128410, filed Dec. 2, 2011, which are hereby incorporated by reference in their entirety.

BACKGROUND

Field of the Invention

The present invention relates to an analysis index providing method and apparatus for calculating an analysis index of a roadway section based on various factors affecting driving.

Description of the Related Art

Recently, a need for objective materials to determine an allocation of liability in car accidents occurring while stopping or driving is increasing. Generally, a car black box is used to provide objective materials, however, an existing car black box only provides simple data associated with vehicle conditions, and thus fails to meet the demand of users effectively.

A navigation device provides map data in which a global positioning system (GPS) location is matched with a map, and guides a user along a requested route using the map data. The navigation device detects and displays driving information including travel distance and time, a maximum speed, and an average speed to allow the user to ascertain driving conditions. However, since an existing navigation device provides rather simple driving information to the user, the navigation device has a limitation in terms of enabling the user to recognize driving habits or driving patterns of the user accurately.

Reference is made to Korean Patent Publication No. 10-2010-0110102, published on Oct. 12, 2010, disclosing an apparatus and method that analyzes a driving habit or driving pattern of a user accurately, calculates driving evaluation information from driving information, and displays the driving evaluation information to promote safer, more economical, and environmentally-friendly driving.

However, the conventional driving evaluation information includes fuel efficiency, a travel speed, carbon emissions, and the like, and only represents information associated with safety and economic efficiency, irrespective of road or traffic conditions. Accordingly, the conventional driving evaluation information simply corresponds to an index indicating a driving habit of a user irrespective of road or traffic conditions, and thus is unsuitable for use in setting a route.

The present disclosure proposes a method and apparatus for calculating an analysis index of a roadway section based on actual road and traffic conditions, as well as fuel efficiency.

BRIEF SUMMARY

An aspect of the present invention provides a method and apparatus for providing an analysis index of a roadway section based on road and traffic conditions as well as fuel efficiency in liters per kilometer (l/km).

Another aspect of the present invention also provides a method and apparatus for calculating an analysis index of a roadway section by synthesizing various factors affecting driving.

Still another aspect of the present invention also provides a method and apparatus for calculating an average index for significant variables of a road by reflecting consistent features on each road axis.

Yet another aspect of the present invention also provides a method and apparatus for calculating an analysis index of a roadway section using a differentiated global positioning system (GPS)- or sensor-based information, or an image taken with a camera.

According to an aspect of the present invention, there is provided a method of providing an analysis index, including calculating a traffic light density of a roadway section using a number of traffic lights installed in the roadway section, calculating road shape information based on at least one of a curvature and a gradient of the roadway section, calculating a speed variation of the roadway section using a change of speed in the roadway section, and calculating an analysis index of the roadway section using the traffic light density, the road shape information, and the speed variation.

According to another aspect of the present invention, there is provided a non-transitory computer-readable recording medium including a program for providing a function of calculating an analysis index of a roadway section, the program including a density calculating code for calculating a traffic light density of a roadway section using a number of traffic lights installed in the roadway section, a road shape information calculating code for calculating road shape information based on at least one of a curvature and a gradient of the roadway section, a speed calculating code for calculating a speed variation of the roadway section using a change of speed in the roadway section, and an index calculating code for calculating an analysis index of the roadway section using the traffic light density, the road shape information, and the speed variation.

According to still another aspect of the present invention, there is provided an apparatus for providing an analysis index, including a density calculating unit to calculate a traffic light density of a roadway section, a road shape information calculating unit to calculate road shape information based on at least one of a curvature and a gradient of the roadway section, a speed calculating unit to calculate a speed variation of the roadway section, and an index calculating unit to calculate an analysis index of the roadway section using the traffic light density, the road shape information, and the speed variation.

The road shape information calculating unit may include a curvature calculating unit to calculate a horizontal alignment curvature of the roadway section.

The road shape information calculating unit may include a gradient calculating unit to calculate a vertical alignment gradient of the roadway section.

The density calculating unit may calculate the traffic light density using a number of traffic lights installed in the roadway section.

The density calculating unit may calculate the traffic light density using a number of traffic lights by which a vehicle is stopped among traffic lights installed in the roadway section.

The density calculating unit may recognize that the vehicle is stopped at the traffic light, using GPS information providing a location of the vehicle or a front view image of the vehicle.

The traffic light density, the road shape information, and the speed variation may be calculated per unit section of the roadway section.

The curvature calculating unit may calculate the horizontal alignment curvature using a change in an intersection angle of a horizontal curve for the roadway section.

The curvature calculating unit may calculate the horizontal alignment curvature by calculating an intersection angle at each intersection point between horizontal lines in the horizontal curve, and by calculating a sum of the intersection angles.

The curvature calculating unit may recognize the change of intersection angle using GPS information providing a location of the vehicle or a front view image of the vehicle.

The gradient calculating unit may calculate the vertical alignment gradient using a difference in grade of a vertical curve for the roadway section.

The gradient calculating unit may calculate the vertical alignment gradient by calculating a difference in grade at each upward sloping part of the vertical curve in a movement direction of the vehicle, and by calculating a sum of the differences of grades.

The gradient calculating unit may recognize the difference in grade using GPS information providing a location of the vehicle or an output value of a sensor sensing an inclination of the vehicle.

The speed calculating unit may calculate the speed variation using a change of speed in the roadway section.

The speed calculating unit may obtain the change of speed using GPS information providing a location of the vehicle or an output value of a sensor sensing a speed of the vehicle.

The index calculating unit may calculate the analysis index by subtracting a sum of the traffic light density, the road shape information, and the speed variation from a reference value.

The index calculating unit may calculate the analysis index per unit section of the roadway section, and may calculate an average of the analysis indices for the entire roadway section.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
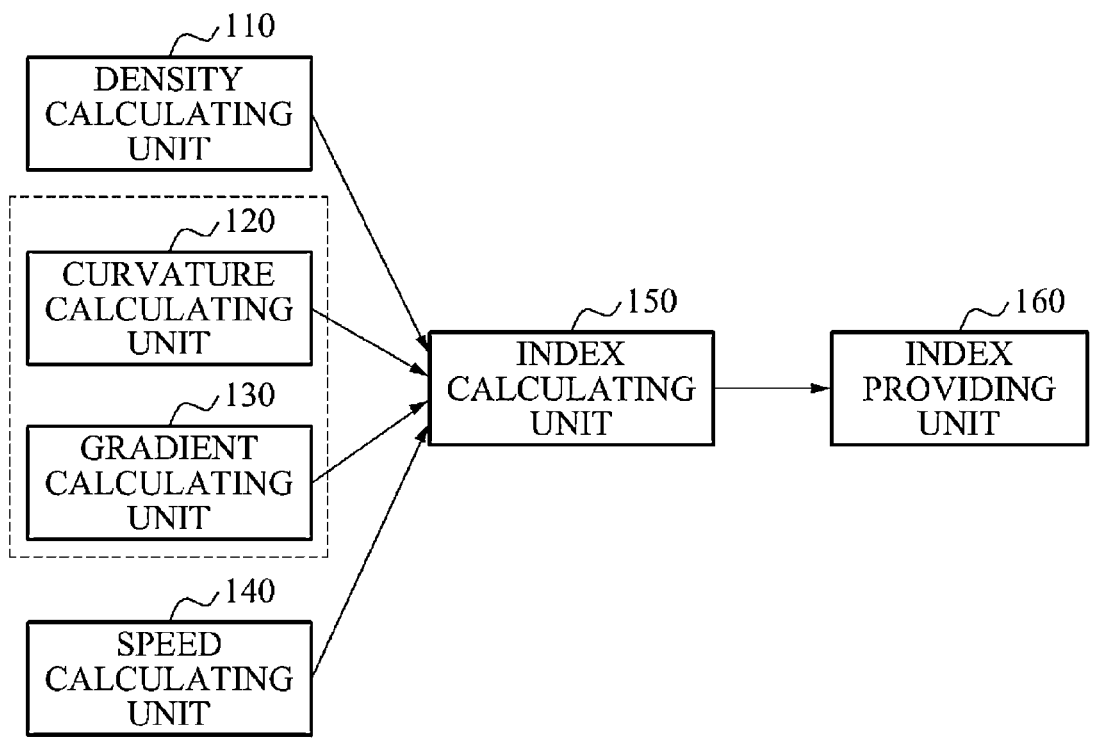
FIG. 1 is a block diagram illustrating an internal structure of an analysis index providing apparatus for calculating an analysis index of a roadway section based on road and traffic conditions according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The exemplary embodiments relate to an analysis index providing method and apparatus for calculating an analysis index of a roadway section based on various factors affecting driving.

The analysis index providing method and apparatus according to the exemplary embodiments may be applied to a black box device or navigation device for vehicles. The black box device or navigation device for vehicles may provide a function of calculating an analysis index of a roadway section. The exemplary embodiments may be implemented as an application dedicated to a mobile terminal, for example, a smart phone, a tablet, and the like.

FIG. 1 is a block diagram illustrating an internal structure of an analysis index providing apparatus 100 for calculating an analysis index of a roadway section based on road and traffic conditions according to an exemplary embodiment of the present invention.

Referring to FIG. 1, the analysis index providing apparatus 100 according to an exemplary embodiment may include a density calculating unit 110, a road shape information calculating unit (a dotted block), a speed calculating unit 140, an index calculating unit 150, and an index providing unit 160. The road shape information calculating unit may include at least one of a curvature calculating unit 120 and a gradient calculating unit 130. Although this exemplary embodiment shows that the road shape information calculating unit includes both the curvature calculating unit 120 and the gradient calculating unit 130, the present invention is not limited thereto. The road shape information calculating unit may include either the curvature calculating unit 120 or the gradient calculating unit 130.

The analysis index providing apparatus 100 may calculate an analysis index based on the traffic light density, the road shape information, and the speed variation of the roadway section to evaluate driving conditions. Here, the road shape information may include at least one of a horizontal alignment curvature and a vertical alignment gradient by the component described in the foregoing.

In the exemplary embodiment, the analysis index providing apparatus 100 may use a global positioning system (GPS)-based location to calculate the traffic light density, the road shape information including the horizontal alignment curvature and/or the vertical alignment gradient, and the speed variation. The analysis index providing apparatus 100 may obtain necessary information directly from a GPS module included in the analysis index providing apparatus 100, or may receive an input of necessary information from a GPS module provided in a device with which the analysis index providing apparatus 100 may interwork.

Also, to calculate the traffic light density, the road shape information, and the speed variation, the analysis index providing apparatus 100 may use an image taken with a car front view camera, an output value from an inclination sensor sensing an inclination of a vehicle, and an output value from a speed sensor sensing a speed of a vehicle. In turn, the analysis index providing apparatus 100 may obtain necessary information directly from a car front view camera, an inclination sensor, and a speed sensor included in the analysis index providing apparatus 100, or may receive an input of necessary information from a car front view camera, an inclination sensor, and a speed sensor provided in a device with which the analysis index providing apparatus 100 may interwork.

The density calculating unit 110 may calculate a traffic light density of a roadway section. In this instance, the density calculating unit 110 may calculate the traffic light density using a number of traffic lights installed in the roadway section. The traffic light density may be represented in "number/kilometer (km)". Among interrupted flow facilities on a road, a traffic light may be one of the most influential indices affecting driving.

The calculation of the traffic light density is described with reference to FIG. 2 below.

Figure 2:
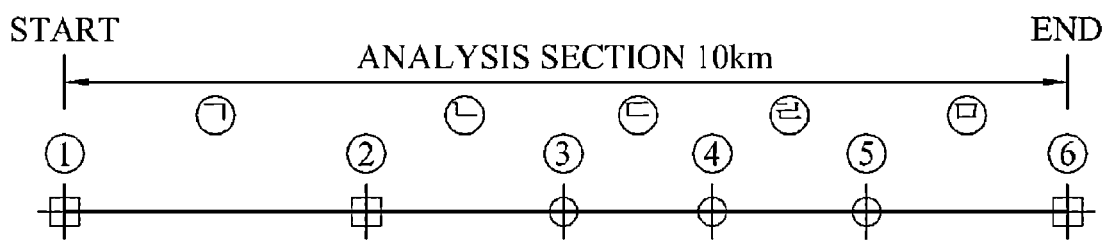
FIG. 2 is a diagram illustrating calculation of a traffic light density according to an exemplary embodiment of the present invention.

For example, in the case of an analysis section being 10 km long, intersections and interchanges may be distributed as shown in FIG. 2. Generally, since a traffic light is rarely installed at an interchange, interchanges may be excluded from consideration when calculating the traffic light density. That is, the traffic light density may be calculated only based on an intersection in which a traffic light is installed, in particular, a number of stops by a stop signal of a traffic light at an intersection.

The density calculating unit 110 may calculate the traffic light density using a number of traffic lights by which a vehicle is stopped among traffic lights installed in the roadway section. In this instance, the density calculating unit 110 may verify whether the vehicle is currently located at an intersection, using GPS information providing a location of the vehicle, and when the vehicle is located at an intersection, may verify whether the vehicle is stopped by a stop signal of a traffic light. That is, the density calculating unit 110 may determine whether the vehicle is stopped by a stop signal of a traffic light at an intersection or passes through an intersection, using GPS information. For example, when GPS information is unchanged at an intersection, the density calculating unit 110 may estimate that the vehicle is stopped at a stop signal of a traffic light at an intersection. In the exemplary embodiment, the traffic light density may be calculated using a number of traffic lights by which the vehicle is stopped. When the vehicle passes through an intersection without stopping, a traffic light through which the vehicle passes may be excluded from consideration when calculating the traffic light density.

To recognize whether the vehicle is stopped at a traffic light more correctly, the density calculating unit 110 may use an image taken with a car front view camera. The density calculating unit 110 may receive an input of an image taken with a car front view camera at an intersection, may verify whether the vehicle is stopped at the intersection through image analysis, and may reflect the verified result on the traffic light density. To minimize an influence of other factors on an analysis index of the roadway section, the density calculating unit 110 may calculate the traffic light density per unit section of the roadway section.

The curvature calculating unit 120 may calculate a horizontal alignment curvature of the roadway section. In this instance, the curvature calculating unit 120 may calculate the horizontal alignment curvature using a change in intersection angle of a horizontal curve for the roadway section. The horizontal alignment curvature may be represented in "degrees)(°)/km", and may refer to an index indicating a degree of curving of the horizontal curve for the roadway section. The curvature calculating unit 120 may calculate the horizontal alignment curvature by calculating a sum of the intersection angles of the horizontal curve per unit section length of the roadway section.

The calculation of the horizontal alignment curvature is described with reference to FIG. 3 below.

Figure 3:
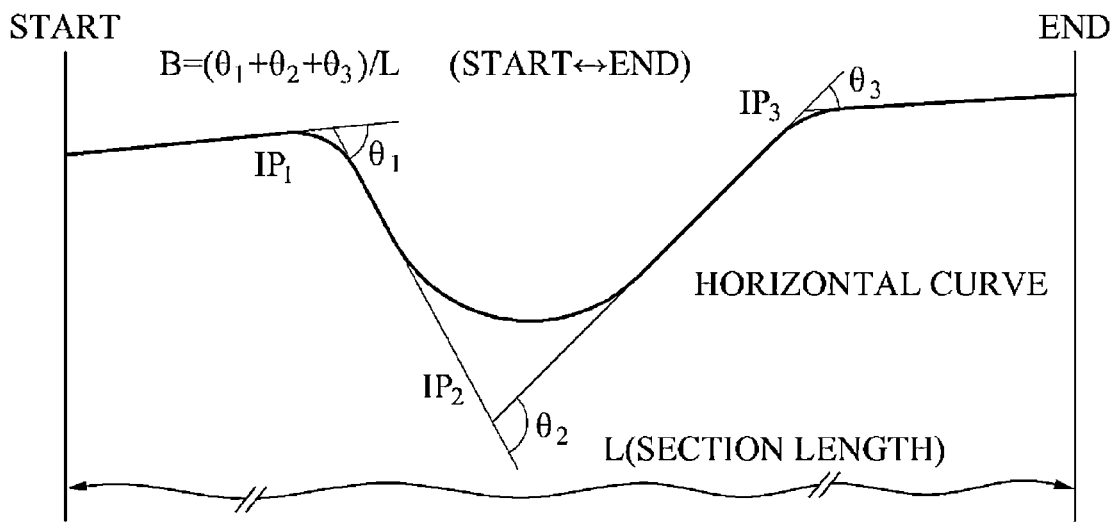
FIG. 3 is a diagram illustrating calculation of a horizontal alignment curvature according to an exemplary embodiment of the present invention.

FIG. 3 is a diagram illustrating calculation of a horizontal alignment curvature according to an exemplary embodiment of the present invention.

Referring to FIG. 3, the intersection angles $\theta_1$, $\theta_2$, and $\theta_3$ may correspond to angles of deflection at intersection points $IP_1$, $IP_2$, and $IP_3$ of the horizontal curve, respectively. The curvature calculating unit 120 may calculate the horizontal alignment curvature by calculating an intersection angle at each intersection point between horizontal lines in the horizontal curve and by calculating a sum of the intersection angles. In this instance, the curvature calculating unit 120 may calculate the horizontal alignment curvature per unit section by calculating a change in intersection angle per unit section of the roadway section. When a length of a unit section is "L", the horizontal alignment curvature B may be calculated to be "$(\theta_1+\theta_2+\theta_3)/L$".

The curvature calculating unit 120 may calculate the horizontal alignment curvature by obtaining a horizontal curve for each unit section using GPS information providing a location of the vehicle, and by calculating a change in intersection angle of the horizontal curve. The curvature calculating unit 120 may recognize the change in intersection angle of the horizontal curve using an image taken with a car front view camera. In this instance, the curvature calculating unit 120 may verify the change in intersection angle of the horizontal curve corresponding to a lane on which the vehicle has moved along the roadway section through analysis of the image taken with the car front view camera, and may reflect the verified result on the horizontal alignment curvature.

The gradient calculating unit 130 may calculate a vertical alignment gradient of the roadway section. In this instance, the gradient calculating unit 130 may calculate the vertical alignment gradient using a difference in grade of a vertical curve for the roadway section. The vertical alignment gradient may be represented in units of "°/km" or "meters (m)/km", and may refer to an index indicating a degree of slope of the vertical curve. The gradient calculating unit 130 may calculate the vertical alignment gradient by calculating a sum of the differences in grades at each upward sloping part of the vertical curve per unit section length.

The calculation of the vertical alignment gradient is described with reference to FIG. 4 below.

Figure 4:
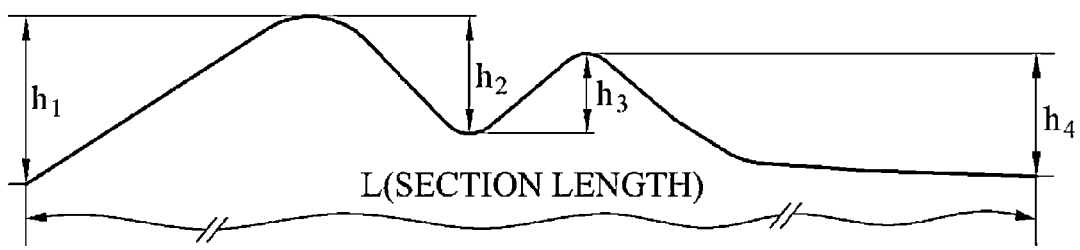
FIG. 4 is a diagram illustrating calculation of a vertical alignment gradient according to an exemplary embodiment of the present invention.

Referring to FIG. 4, the gradient calculating unit 130 may calculate the vertical alignment gradient by calculating a difference in grade at each upward sloping part of the vertical curve corresponding to a road on which the vehicle is moving, in a movement direction of the vehicle, and by calculating a sum of the differences in grades. In the exemplary embodiment, a downward sloping part of the vertical curve may be excluded from consideration when calculating the vertical alignment gradient. When the movement direction is left-to-right in the graph, a height of each upward sloping part of the vertical curve may correspond to $h_1$ and $h_3$. In this instance, when a length of a unit section is "L", the vertical alignment gradient H may be calculated to be "$(h_1+h_3)/L$". When the movement direction is right-to-left in the graph, a height of each upward sloping part of the vertical curve may correspond to $h_4$ and $h_2$. In this instance, the vertical alignment gradient H may be calculated to be "$(h_2+h_4)/L$". The gradient calculating unit 130 may calculate the vertical alignment gradient per unit section by calculating a change in intersection angle per unit section of the roadway section.

The gradient calculating unit 130 may calculate the horizontal alignment curvature by obtaining a vertical curve for a unit section using GPS information providing a location of the vehicle, and by calculating a difference in grade of the vertical curve. The gradient calculating unit 130 may recognize the difference in grade of the vertical curve using an output value from a sensor sensing an inclination of the vehicle to a road surface. That is, the gradient calculating unit 130 may recognize the difference in grade of the vertical curve based on an inclination value sensed by the inclination sensor in the roadway section, and may reflect the recognized result on the vertical alignment gradient.

The speed calculating unit 140 may calculate a speed variation of the roadway section. In this instance, the speed calculating unit 140 may calculate the speed variation using a change of speed in the roadway section. The speed variation may be represented in units of "$(|\Delta v|)/km$", and may correspond to an index indicating a constant speed drive. The speed variation may include an acceleration variable and a deceleration variable. The speed variation may be used to calculate an analysis index, along with the traffic light density, the horizontal alignment curvature, and the vertical alignment gradient. The speed variation may reflect acceleration and deceleration in an absolute value.

Figure 5:
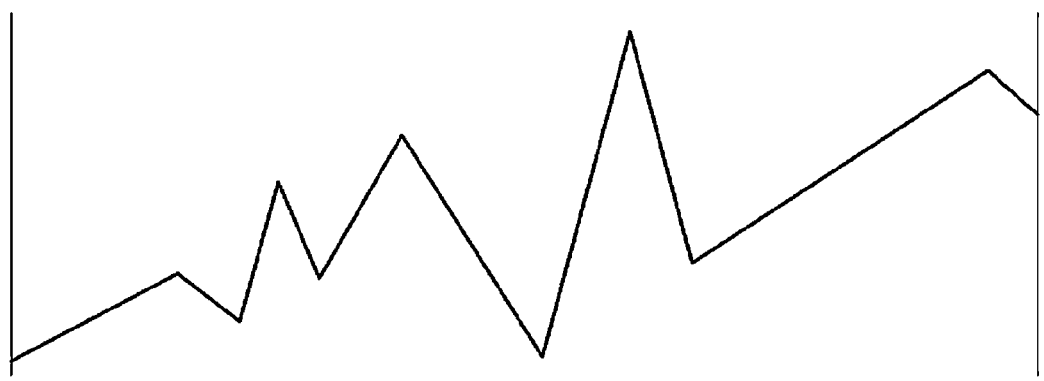
FIG. 5 is a diagram illustrating calculation of a speed variation according to an exemplary embodiment of the present invention.

FIG. 5 illustrates a change of speed in a unit section.

Referring to FIG. 5, as an occurrence of friction increases, degree of speed change may increase. The speed calculating unit 140 may calculate the speed variation based on a change of speed in a unit section irrespective of a magnitude of speed. In this instance, the speed calculating unit 140 may calculate the speed variation per unit section by calculating the change of speed per unit section of the roadway section.

The speed calculating unit 140 may calculate the speed variation by recognizing the change of speed in a unit section using GPS information providing a location of the vehicle. The speed calculating unit 140 may use an output value of a sensor sensing a speed of the vehicle to recognize the change of speed. That is, the speed calculating unit 140 may recognize a change of speed in a unit section based on a speed value sensed by a speed sensor in the roadway section, and may reflect the recognized result on the speed variation.

The index calculating unit 150 may calculate an analysis index of the roadway section using the calculated variables, that is, the traffic light density, the road shape information including the horizontal alignment curvature, the vertical alignment gradient, and the speed variation. In this instance, since the traffic light density, the road shape information, and the speed variation is calculated per unit section, the index calculating unit 150 may calculate the analysis index per unit section of the roadway section to eliminate an influence of other factors on the analysis index. The index calculating unit 150 may calculate the analysis index by subtracting a rate at which travel speed decreases for each variable from a reference value of the analysis index. In this instance, the index calculating unit 150 may calculate the analysis index per unit section of the roadway section, and may calculate an average of the analysis indices for the entire roadway section.

For example, the index calculating unit 150 may calculate the analysis index by subtracting a sum of the traffic light density, the horizontal alignment curvature, the vertical alignment gradient, and the speed variation from a reference value, as shown in Equation 1.

$$R \text{ index} = \text{reference value} - [r_{ts} + r_B + r_H + r_{\Delta v}] \quad \text{Equation 1}$$

where R index denotes an analysis index, $r_{ts}$ denotes a traffic light density, $r_B$ denotes a horizontal alignment curvature, $r_H$ denotes a vertical alignment gradient, and $r_{\Delta v}$ denotes a speed variation. The traffic light density $r_{ts}$, the horizontal alignment curvature $r_B$, the vertical alignment gradient $r_H$, and the speed variation $r_{\Delta v}$ may be defined as follows:

$$r_{ts} = \alpha_1 * N_{ts}/L$$

$$r_B = \{(\Sigma \theta_{Bi}/L) - \alpha_2\}/\alpha_2$$

$$r_H = (\Sigma \theta_{Hi}/L)/\alpha_3 \text{ or } r_H = (\Sigma H_i/L)/\alpha_3$$

$$r_{\Delta v} = (\Sigma |v_i - v_{i+1}|/L) * \alpha_4$$

where $\alpha_1$ denotes a parameter of a traffic light density variable, $\alpha_2$ denotes a parameter of a horizontal alignment curvature variable, $\alpha_3$ denotes a parameter of a vertical alignment gradient variable, and $\alpha_4$ denotes a parameter of a speed variation variable. Also, L denotes an analysis section, that is, a unit section, $N_{ts}$ denotes a number of traffic lights in the analysis section, $\theta_{Bi}$ denotes a curvature of the analysis section, $\theta_{Hi}$ denotes a gradient of the analysis section, and $v_i$ denotes a speed scalar value of the analysis section. In this instance, the parameters $\alpha_1$, $\alpha_2$, $\alpha_3$, and $\alpha_4$ of each variable need proper adjustment through tuning, for example, on a regional basis. That is, the parameters $\alpha_1$, $\alpha_2$, $\alpha_3$, and $\alpha_4$ of each variable may be set flexibly to be a tuned value by experience or experiments.

The index providing unit 160 may provide the analysis index in a displayable form, as well as the traffic light density, the road shape information, and the speed variation. For example, when the analysis index providing apparatus 100 includes a display, the index providing unit 160 may display individual values of each variable and the synthetic analysis index through the display. As another example, the index providing unit 160 may support the display of each variable and the analysis index through a device with which the analysis index providing apparatus 100 may interwork, by transmitting the traffic light density, the road shape information, the speed variation, and the analysis index to the corresponding device. The displaying of the individual values of each variable and the analysis index may be implemented in all devices that may display data to a user visually, including a personal computer (PC), a mobile terminal, a black box device for vehicles, a navigation device for vehicles, a server system, and the like.

Figure 6:
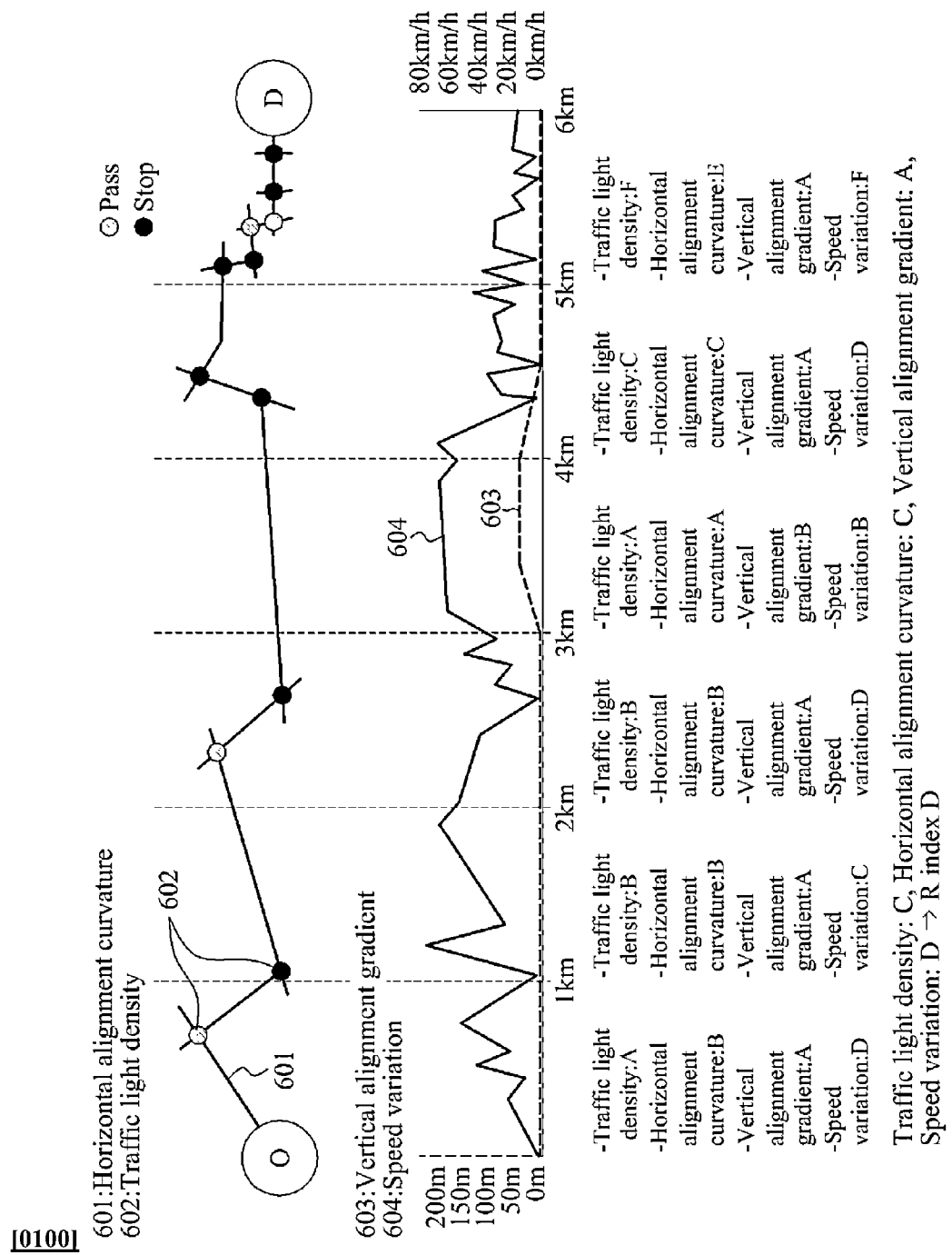
FIG. 6 is a diagram illustrating an example of a service display providing an analysis index of a flat public roadway section according to an exemplary embodiment of the present invention.

FIG. 6 is a diagram illustrating an example of a service display providing each variable and the analysis index of the roadway section.

Referring to FIG. 6, a graph 601 represents the horizontal alignment curvature of the roadway section, a graph 602 represents the traffic light density of the roadway section, a graph 603 represents the vertical alignment gradient of the roadway section, and a graph 604 represents the speed variation of the roadway section. Here, the traffic light density graph 602 may represent an intersection point on the horizontal alignment curvature graph 601, and may display a stopping or passing of a vehicle by a signal at each point. That is, the stopping and passing of the vehicle may be displayed differently. Also, the vertical alignment gradient graph 603 and the speed variation graph 604 may display changes throughout the entire roadway section. The service display may display an index for an individual value of each variable per unit section, for example, 1 km, an average index for each variable, and an analysis index, that is, an R index. The average index for each variable may be obtained by calculating an average of the indices of each variable per unit section, and the R index may be calculated by synthesizing each variable. The vertical alignment gradient graph 603 may show that a difference in grade of about 50 m occurs at a section between 3 km and 4 km, when compared to the other sections.

In FIG. 6, a flat public roadway section of 6 km is shown. The flat public roadway section exhibits a topographic characteristic in that an influence of a traffic light density variable or a speed variation variable is much greater than an influence of road alignment. An analysis index for the entire roadway section may be calculated using an index for each variable determined per kilometer, due to characteristics of the analysis index. In a section between 5 km and 6 km, it may be found that the analysis index is reduced significantly when compared to the other sections, due to a relatively low level of gradient, a relatively high level of traffic light density, and a steep drop in speed.

Relative points A to F may be assigned to each variable needed to calculate the analysis index R, that is, the traffic light density, the horizontal alignment curvature, the speed variation, and the vertical alignment gradient. Each variable may be measured per unit section while driving along the roadway section of 6 km. The point A may correspond to a highest point, and the point F may correspond to a lowest point.

In FIG. 6, the analysis index R may be calculated to be "D" based on a point "C" of the traffic light density, a point "C" of the horizontal alignment curvature, a point "A" of the vertical alignment gradient, and a point "D" of the speed variation for the entire roadway section of 6 km, and may be displayed to a user. The analysis index R may be graded A to F, and the grade A may be highest and the grade F may be lowest.

Figure 7:
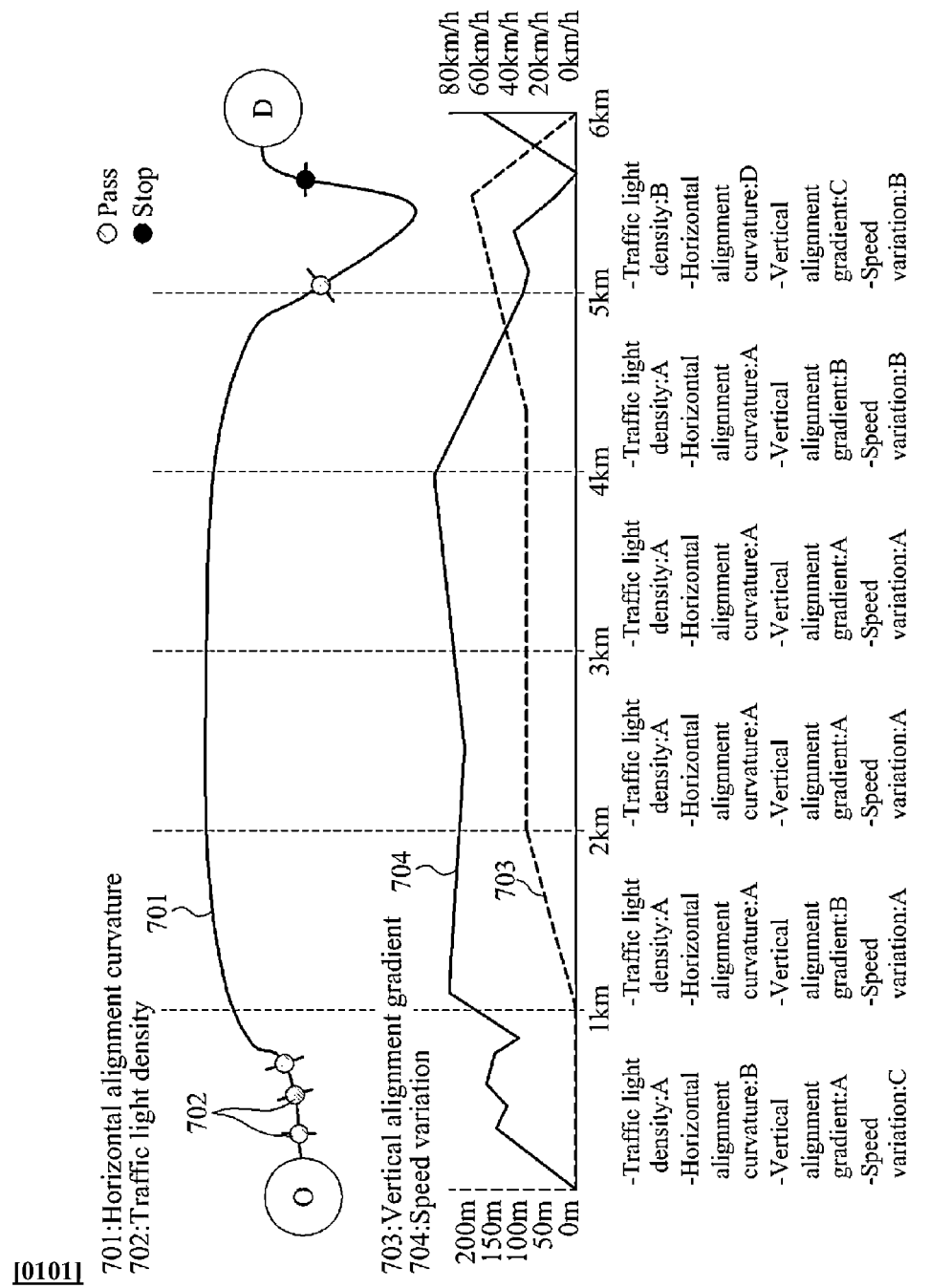
FIG. 7 is a diagram illustrating an example of a service display providing an analysis index of a bumpy country roadway section according to an exemplary embodiment of the present invention.

Referring to FIG. 7, a horizontal alignment curvature graph 701, a traffic light density graph 702, a vertical alignment gradient graph 703, and a speed variation graph 704 for a bumpy country roadway section of 6 km are provided. Generally, a bumpy country roadway exhibits a topographic characteristic in an influence of road alignment is moderately greater than an influence of a traffic light density variable or a speed variation variable. Here, a section between 0 km and 1 km has a relatively high level of traffic light density since three traffic lights are installed, but a travel speed is barely influenced by a signal due to non-stop driving.

Accordingly, the analysis index may correspond to an evaluation index in which consistent features are reflected on each axis of a road travelled. The analysis index may be used to recognize factors affecting driving as well as driving conditions. Since the analysis index is closely related with actual road and traffic conditions, the analysis index may be useful in setting a route. For example, when data of each variable reflected on the analysis index is accumulated per road or time, a suitable route may be provided by searching for a roadway or a time zone suitable for safe and economic driving. In this example, a section between 1 km and 5.5 km of the vertical alignment gradient graph 703 may correspond to an upward slope, and a section between 5.5 km and 6 km corresponds to a downward slope.

In FIG. 7, the analysis index R may be calculated to be "B" based on a point "B" of the traffic light density, a point "B" of the horizontal alignment curvature, a point "B" of the vertical alignment gradient, and a point "B" of the speed variation for the entire roadway section of 6 km, and may be displayed to a user. That is, the analysis index for driving habits of FIG. 7 is greater than the analysis index for driving habits of FIG. 6.

Various functions of the analysis index providing apparatus may be implemented as hardware and/or software including at least one of an integrated circuit for signal processing and an application-specific integrated circuit.

Figure 8:
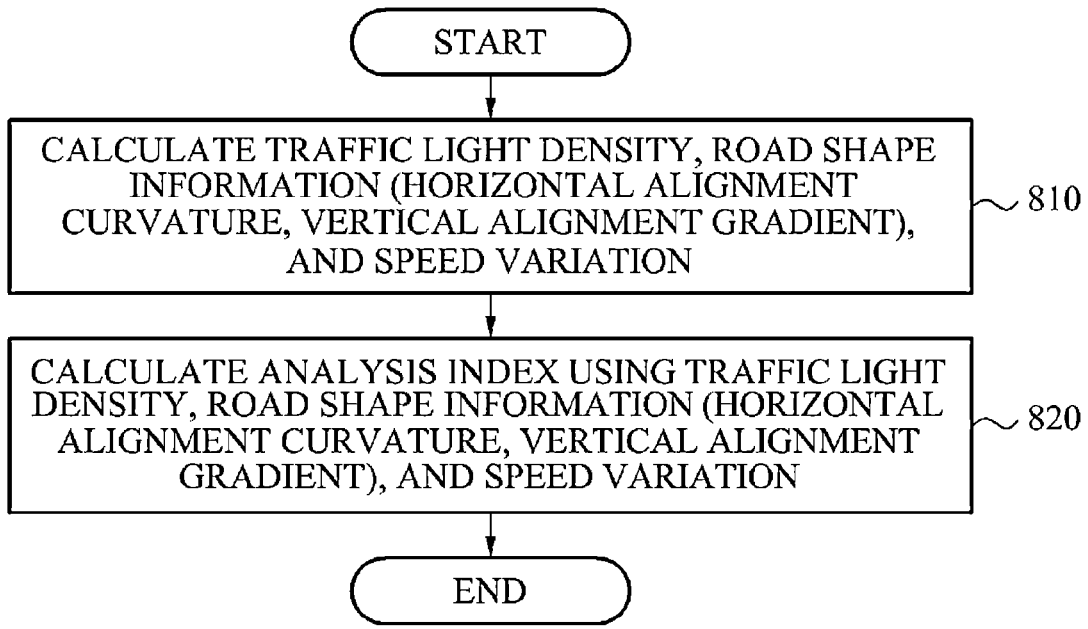
FIG. 8 is a flowchart illustrating an analysis index providing method for calculating an analysis index of a roadway section based on road and traffic conditions according to an exemplary embodiment of the present invention.

FIG. 8 is a flowchart illustrating an analysis index providing method for calculating the analysis index of the roadway section based on road and traffic conditions according to an exemplary embodiment of the present invention. The analysis index providing method may be performed by the analysis index providing apparatus 100 of FIG. 1.

In operation 810, the analysis index providing apparatus 100 may calculate the traffic light density, the road shape information, and the speed variation of the roadway section. The analysis index providing apparatus 100 may calculate the traffic light density using a number of traffic lights installed in the roadway section, in particular, a number of traffic lights by which a vehicle is stopped among traffic lights installed in the roadway section. In this instance, the analysis index providing apparatus 100 may recognize that the vehicle is stopped by a traffic light, using at least one of GPS information providing a location of the vehicle and an image taken with a car front view camera. Next, the analysis index providing apparatus 100 may calculate the road shape information of the roadway section based on at least one of the horizontal alignment curvature and the vertical alignment gradient. In this instance, the road shape information may include at least one of the horizontal alignment curvature and the vertical alignment gradient. The analysis index providing apparatus 100 may calculate the horizontal alignment curvature using a change in intersection angle of a horizontal curve for the roadway section. The analysis index providing apparatus 100 may calculate the horizontal alignment curvature by calculating an intersection angle at each intersection point between horizontal lines in the horizontal curve, and by calculating a sum of the intersection angles. In this instance, the analysis index providing apparatus 100 may recognize the change in intersection angle of the horizontal curve for the roadway section using at least one of GPS information providing a location of the vehicle and an image taken with a car front view camera. Also, the analysis index providing apparatus 100 may calculate the vertical alignment gradient using a difference in grade of a vertical curve for the roadway section. The analysis index providing apparatus 100 may calculate the vertical alignment gradient by calculating a difference in grade at each upward sloping part of the vertical curve in a movement direction of the vehicle, and by calculating a sum of the differences in grades. In this instance, the analysis index providing apparatus 100 may recognize the difference in grade of the vertical curve for the roadway section using at least one of GPS information providing a location of the vehicle and an output value from a sensor sensing an inclination of the vehicle. Next, the analysis index providing apparatus 100 may calculate the speed variation of the roadway section using a change of speed in the roadway section. In this instance, the analysis index providing apparatus 100 may recognize the change of speed in the roadway section using GPS information providing a location of the vehicle and an output value of a sensor sensing a speed of the vehicle. Next, the analysis index providing apparatus 100 may calculate the traffic light density, the road shape information including the horizontal alignment curvature and/or the vertical alignment gradient, and the speed variation per unit section of the roadway section to minimize an influence of other factors.

In operation 820, the analysis index providing apparatus 100 may calculate the analysis index of the roadway section using the calculated variables, that is, the traffic light density, the road shape information including the horizontal alignment curvature and/or the vertical alignment gradient, and the speed variation. In this instance, the analysis index providing apparatus 100 may calculate the analysis index by subtracting a sum of the traffic light density, the road shape information, and the speed variation from a reference value. When the traffic light density, the road shape information, and the speed variation are calculated per unit section of the roadway section, the analysis index providing apparatus 100 may calculate the analysis index for the entire roadway section by calculating the analysis index per unit section of the roadway section, and by calculating an average of the analysis indices. The analysis index and each variable calculated by the analysis index providing apparatus 100 may be provided to a user in various forms as described with reference to FIGS. 6 and 7, and may be used in setting a route.

The analysis index providing method may include an additional operation based on various functions of the analysis index providing apparatus 100 are described with reference to FIGS. 1 through 5.

According to the exemplary embodiments of the present invention, factors affecting driving as well as driving conditions may be recognized with ease, through the analysis index of the roadway section calculated based on road and traffic conditions.

The above-described exemplary embodiments of the present invention may be recorded in computer-readable media including program instructions to implement various operations embodied by a computer. In particular, the exemplary embodiments may include a non-transitory computer-readable recording medium comprising a program including a density calculating code for calculating the traffic light density of the roadway section using a number of traffic lights installed in the roadway section, a road shape information calculating code for calculating the road shape information based on at least one of the curvature and the gradient of the roadway section, a speed calculating code for calculating the speed variation of the roadway section using a change of speed in the roadway section, and an index calculating code for calculating the analysis index of the roadway section using the traffic light density, the road shape information, and the speed variation. In this instance, the road shape information calculating code may include at least one of a curvature calculating code for calculating the horizontal alignment curvature of the roadway section using a change in intersection angle of a horizontal curve for the roadway section, and a gradient calculating code for calculating the vertical alignment gradient of the roadway section using a difference in grade of a vertical curve for the roadway section. Here, to provide a function of calculating the analysis index of the roadway section, an index providing code may be further included to provide the analysis index in various forms as described with reference to FIGS. 6 and 7.

The program according to the exemplary embodiments may be implemented as a PC-based program or an application dedicated for a mobile terminal, for example, a smart phone application, a virtual machine (VM) for a feature phone, and the like. The program may be executed by at least one processor operating in a device, for example, a PC, a mobile terminal, a black box device, a navigation device, a server system, and the like.

The computer-readable media may also include, alone or in combination with the program instructions, data files, data structures, and the like. The media and program instructions may be those specially designed and constructed for the purposes of the present subject matter, or they may be of the kind well known and available to those having skill in the computer software arts. The file system may be recorded in computer-readable recording media.

According to the exemplary embodiments, factors affecting driving as well as driving conditions may be recognized with ease through an analysis index of a roadway section calculated based on road and traffic conditions as well as economic efficiency.

Since driving conditions and factors affecting driving are recognized through an analysis index, a user may be trained to drive safely and economically efficiently. The analysis index reflecting actual road and traffic conditions may be useful in setting a route.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing an analysis index using a processor, computer executable instructions for performing the method being stored on a non-transitory computer readable recording medium and being implemented by the processor when executed, the method comprising:

collecting information regarding the number of traffic lights installed in a roadway section and information about at least one of a curvature and a gradient of the roadway section with a GPS module, a sensor, or a camera while a vehicle is moving on the roadway section;

calculating, by the processor, the traffic light density of the roadway section on which the vehicle is moving using the number of traffic lights installed in the roadway section and GPS information of the vehicle;

calculating, by the processor, the road shape information based on at least one of the curvature and the gradient of the roadway section using the GPS information of the vehicle;

calculating, by the processor, a speed variation of the roadway section using a change of speed in the roadway section;

calculating, by the processor, an analysis index of the roadway section based on the traffic light density, the road shape information, and the speed variation;

providing, by the processor, the analysis index in displayable form; and using the analysis index to determine a route of the vehicle with a recording device or a navigation device, thereby improving the route determination capability of said device;

wherein calculating the analysis index of the roadway section comprises calculating the analysis index by subtracting at least one of the traffic light density, the road shape information, and the speed variation from a reference value.

2. The method of claim 1, wherein the calculating of the road shape information comprises calculating a horizontal alignment curvature of the roadway section using a change in intersection angle of a horizontal curve for the roadway section.

3. The method of claim 1, wherein the calculating of the road shape information comprises calculating a vertical alignment gradient of the roadway section using a difference in grade of a vertical curve for the roadway section.

4. A non-transitory computer-readable recording medium containing executable program instructions executed by a processor that stores a program for providing a function of calculating an analysis index of a roadway section, the program comprising: program instructions that cause a GPS module, a sensor, or a camera to collect information regarding the number of traffic lights installed in a roadway section and information about at least one of a curvature and a gradient of the roadway section while a vehicle is moving on the roadway section; program instructions that calculate the traffic light density of the roadway section on which the vehicle is moving using the number of traffic lights installed in the roadway section and GPS information of the vehicle; program instructions that calculate the road shape information based on at least one of the curvature and the gradient of the roadway section using the GPS information of the vehicle; program instructions that calculate a speed variation of the roadway section using a change of speed in the roadway section; program instructions that calculate an analysis index of the roadway section using the traffic light density, the road shape information, and the speed variation; program instructions that provide the analysis index in displayable form; and program instructions that use the analysis index to determine a route of the vehicle within a recording device or a navigation device, thereby improving the route determination capability of said device; wherein the program instructions that calculate the analysis index do so by subtracting at least one of the traffic light density, the road shape information, and the speed variation from a reference value.

5. An apparatus for providing an analysis index, the apparatus comprising a processor and at least one of a GPS module, a sensor, and a camera, wherein the processor is configured to: direct the GPS module, the sensor, or the camera to collect information regarding the number of traffic lights installed in a roadway section and information about at least one of a curvature and a gradient of the roadway section while a vehicle is moving on the roadway section; calculate a traffic light density of the roadway section on which the vehicle is moving using the number of traffic lights installed in the roadway section and GPS information of the vehicle; calculate road shape information based on at least one of the curvature and the gradient of the roadway section using the GPS information of the vehicle; calculate a speed variation of the roadway section; calculate an analysis index of the roadway section using the traffic light density, the road shape information, and the speed variation; provide the analysis index in displayable form; and use the analysis index to determine a route of the vehicle within a recording device or navigation device, thereby improving the route determination capability of said device; wherein the processor is configured to calculate the analysis index by subtracting at least one of the traffic light density, the road shape information, and the speed variation from a reference value.

6. The apparatus of claim 5, wherein the processor is further configured to calculate a horizontal alignment curvature of the roadway section.

7. The apparatus of claim 5, wherein the processor is further configured to calculate a vertical alignment gradient of the roadway section.

8. The apparatus of claim 5, wherein the processor is configured to calculate the traffic light density using a number of traffic lights by which a vehicle is stopped among traffic lights installed in the roadway section.

9. The apparatus of claim 8, wherein the processor is configured to recognize that the vehicle is stopped by the traffic light, using global positioning system (GPS) information providing a location of the vehicle or a front view image taken from the camera of the vehicle.

10. The apparatus of claim 8, wherein the traffic light density, the road shape information, and the speed variation are calculated per unit section of the roadway section.

11. The apparatus of claim 6, wherein the processor is configured to calculate the horizontal alignment curvature using a change in intersection angle of a horizontal curve for the roadway section.

12. The apparatus of claim 11, wherein the processor is configured to calculate the horizontal alignment curvature by calculating an intersection angle at each intersection point between horizontal lines in the horizontal curve, and by calculating a sum of the intersection angles.

13. The apparatus of claim 11, wherein the processor is configured to recognize the change of intersection angle using GPS information providing a location of the vehicle or a front view image taken from the camera of the vehicle.

14. The apparatus of claim 7, wherein the processor is configured to calculate the vertical alignment gradient using a difference in grade of a vertical curve for the roadway section.

15. The apparatus of claim 14, wherein the processor is configured to calculate the vertical alignment gradient by calculating a difference in grade at each upward sloping part of the vertical curve in a movement direction of the vehicle, and by calculating a sum of the differences of grades.

16. The apparatus of claim 14, wherein the processor is configured to recognize the difference in grade using GPS information providing a location of the vehicle or an output value of the sensor sensing an inclination of the vehicle.

17. The apparatus of claim 5, wherein the processor is configured to calculate the speed variation using a change of speed in the roadway section, and obtain the change of speed using GPS information providing a location of the vehicle or an output value of the sensor sensing a speed of the vehicle.

18. The apparatus of claim 5, wherein the processor is configured to calculate the analysis index by subtracting a sum of the traffic light density, the road shape information, and the speed variation from a reference value.

19. The apparatus of claim 5, wherein the processor is configured to calculate the analysis index per unit section of the roadway section, and calculates an average of the analysis indices for the entire roadway section.

* * * * *